(12) United States Patent
Meese

(10) Patent No.: US 7,249,276 B2
(45) Date of Patent: Jul. 24, 2007

(54) SIGNAL ROUTE SELECTOR AND METHOD OF SIGNAL ROUTING

(75) Inventor: Rupert Meese, Draycott (GB)

(73) Assignee: Ericsson AB, Stockholm (SE)

( * ) Notice: Subject to any disclaimer, the term of this patent is extended or adjusted under 35 U.S.C. 154(b) by 205 days.

(21) Appl. No.: 10/479,478

(22) PCT Filed: May 29, 2002

(86) PCT No.: PCT/GB02/02530

§ 371 (c)(1),
(2), (4) Date: Jun. 7, 2004

(87) PCT Pub. No.: WO02/098074

PCT Pub. Date: Dec. 5, 2002

(65) Prior Publication Data

US 2004/0208161 A1    Oct. 21, 2004

(30) Foreign Application Priority Data

May 29, 2001  (GB)  .................... 0112955.0

(51) Int. Cl.
*G06F 11/00* (2006.01)
(52) U.S. Cl. .................. 714/4; 714/3; 714/26; 370/225
(58) Field of Classification Search ............... 714/4, 714/3, 26, 43; 370/238, 225
See application file for complete search history.

(56) References Cited

U.S. PATENT DOCUMENTS

| | | | |
|---|---|---|---|
| 4,875,037 A | 10/1989 | Escolar | |
| 5,065,399 A | 11/1991 | Hasegawa et al. | |
| 5,452,294 A | 9/1995 | Natarajan | |
| 5,649,108 A | 7/1997 | Spiegel et al. | |
| 6,134,588 A * | 10/2000 | Guenthner et al. | 709/226 |
| 6,341,356 B1 * | 1/2002 | Johnson et al. | 714/4 |
| 6,769,071 B1 * | 7/2004 | Cheng et al. | 714/4 |
| 6,802,021 B1 * | 10/2004 | Cheng et al. | 714/4 |
| 6,823,477 B1 * | 11/2004 | Cheng et al. | 714/26 |
| 2001/0034853 A1 * | 10/2001 | Takatama et al. | 714/4 |
| 2002/0065962 A1 * | 5/2002 | Bakke et al. | 710/38 |
| 2003/0002443 A1 * | 1/2003 | Basso et al. | 370/237 |

FOREIGN PATENT DOCUMENTS

| | | |
|---|---|---|
| WO | WO 98/28924 | 7/1998 |
| WO | WO 00/03324 | 1/2000 |

* cited by examiner

*Primary Examiner*—Marc Duncan
(74) *Attorney, Agent, or Firm*—Kirschstein, et al.

(57) ABSTRACT

A signal route selector for routing a signal between a source and a destination over one of a plurality of alternative routes comprises a response monitor for determining whether transmissions between the source and destination succeed or fail on a selected route. A record of the successes and failures for the routes is maintained and a determination is made of the probability that a transmission will succeed on any route. A route for a transmission is selected according to the probabilities of success for the alternative routes.

10 Claims, 4 Drawing Sheets

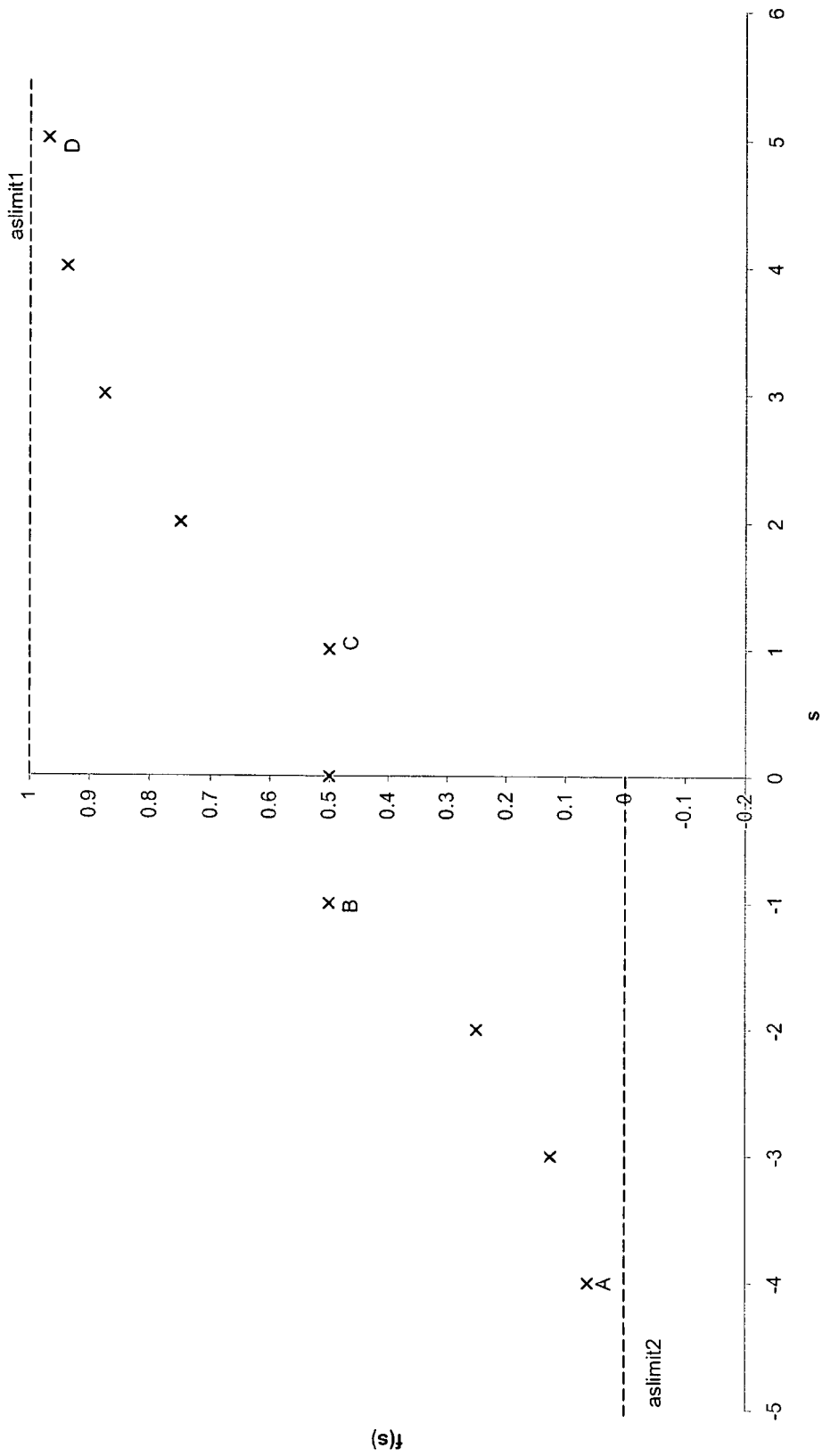

SIGNAL ROUTE SELECTOR AND METHOD OF SIGNAL ROUTING

Figure 1:
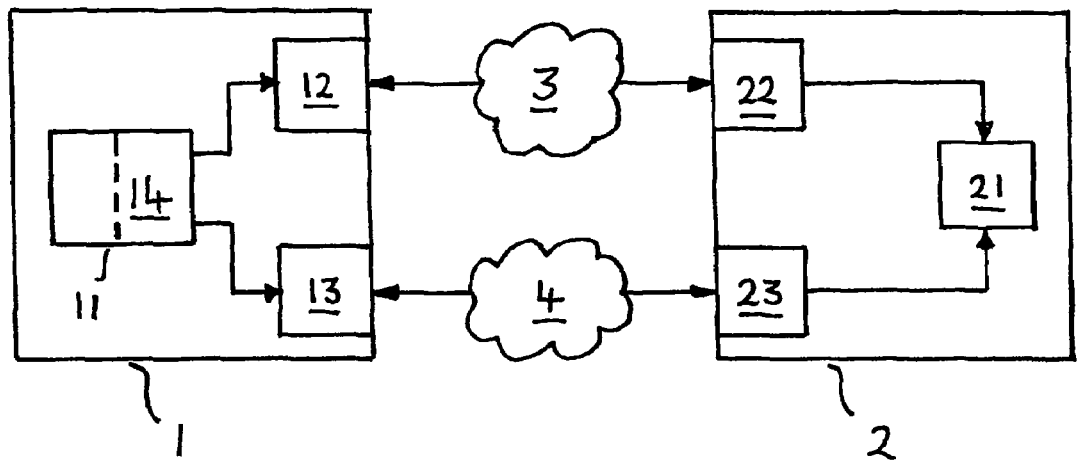

The present invention relates to a signal route selector for, and a method of, routing a signal along one of a plurality of alternative routes between a signal source and a signal destination.

The invention the invention is especially suitable for transmission systems in which the interconnecting networks between a signal source and a signal destination are duplicated in order to make the system fault-tolerant.

According to the present invention there is provided a signal route selector for routing a signal between a source and a destination, there being a plurality of alternative routes between the source and the destination, the route selector being characterised by: means for determining whether transmissions between the source and destination succeed or fail, means for maintaining a record of the successes and failures for the routes and means for selecting a route for a transmission according to the record of successes and failures for the routes.

Preferably, the signal route selector, in operation, awards probability values of successful transmission to the routes according to the record of the successes and failures for the routes and selects a route according to the awarded probability values.

Preferably, the signal route selector, in operation, awards probability values ranging between a first limit value for repeated success and a second limit value for repeated failure.

Preferably, the signal route selector, in operation, awards probability values including a normal value lying substantially halfway between the limit values for repeated successes on all of the routes, for a selected ratio of usage of the routes.

In one arrangement, the signal route selector, in operation, selects the ratio of the usage of the routes as equal usage of the routes.

Preferably, the signal route selector so operates that the normal value remains the same for a range of values of a variable derived from the successes and failures.

Preferably, the signal route selector so operates that a route which is awarded a limit value is selected from time to time according to the awarded probability value.

Preferably, the signal route selector so operates that selecting a route for transmission follows awarding a probability of success $f(s)$ in accordance with
$f(s)=1-2^{-s}$ for $s=1, 2, \ldots n$,
$f(s)=\frac{1}{2}$ for $s=0$,
$f(s)=2^s$ for $s=-1, -2, \ldots -n$, which is discontinuous, where s is a variable which is always an integer and is derived from the successes and failures of transmission attempts as follows:

if the attempt to use a first transmission network succeeded, make $s=s+1$, if $s<0$, if the attempt to use an alternative transmission network succeeded, make $s=s-1$, if $s>0$, if the attempt to use the first transmission network failed, make $s=s-1$, if $|s|<aslimit1$, if the attempt to use the alternative transmission network failed, make $s=s+1$, if $|s|<aslimit2$.

According to a second aspect of the invention there is provided a method of routing a signal along one of a plurality of alternative routes between a source and a destination, the method characterised by: determining whether transmissions between the source and destination succeed or fail, maintaining a record of the successes and failures for the routes and selecting a route for a transmission according to the record of successes and failures for the routes.

Preferably, the method further comprises awarding probability values of successful transmission to the routes according to the record of the successes and failures for the routes, and selecting a route according to the awarded probability values.

Preferably, the probability values range between a first limit value for repeated success and a second limit value for repeated failure.

Preferably, the probability values include a normal value lying substantially halfway between the limit values for repeated successes on all of the routes, for a selected ratio of usage of the routes.

In one arrangement, the selected ratio of the usage of the routes is equal usage of the routes.

Preferably, the normal value remains the same for a range of values of a variable derived from the successes and failures.

Preferably, a route which is awarded a limit value is selected from time to time according to the awarded probability value.

Preferably, the method comprises selecting a route for transmission follows awarding a probability of success $f(s)$ in accordance with
$f(s)=1-2^{-s}$ for $s=1, 2, \ldots n$,
$f(s)=\frac{1}{2}$ for $s=0$,
$f(s)=2^s$ for $s=-1, -2, \ldots -n$, which is discontinuous, where s is a variable which is always an integer and is derived from the successes and failures of transmission attempts as follows:

if the attempt to use a first transmission network succeeded, make $s=s+1$, if $s<0$, if the attempt to use an alternative transmission network succeeded, make $s=s-1$, if $s>0$, if the attempt to use the first transmission network failed, make $s=s-1$, if $|s|<aslimit1$, if the attempt to use the alternative transmission network failed, make $s=s+1$, if $|s|<aslimit2$.

Figure 3:
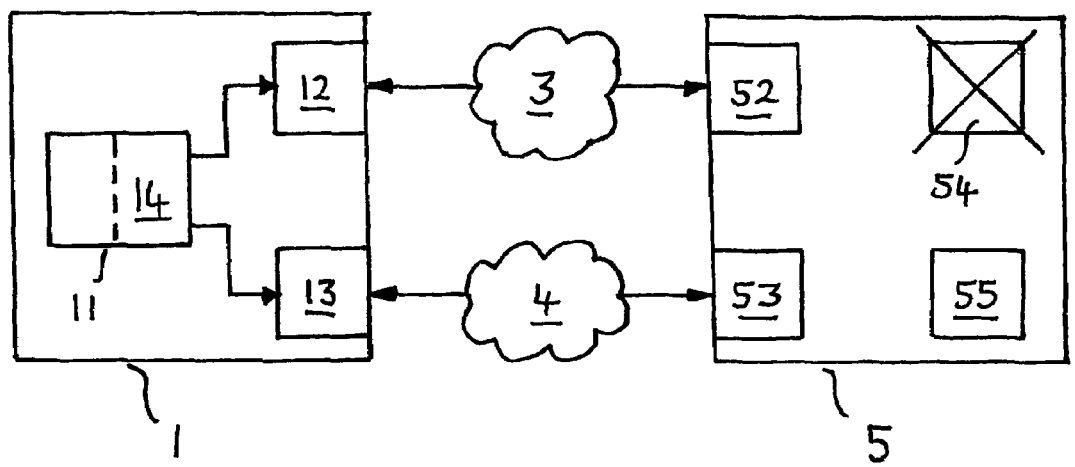
Figure 2:
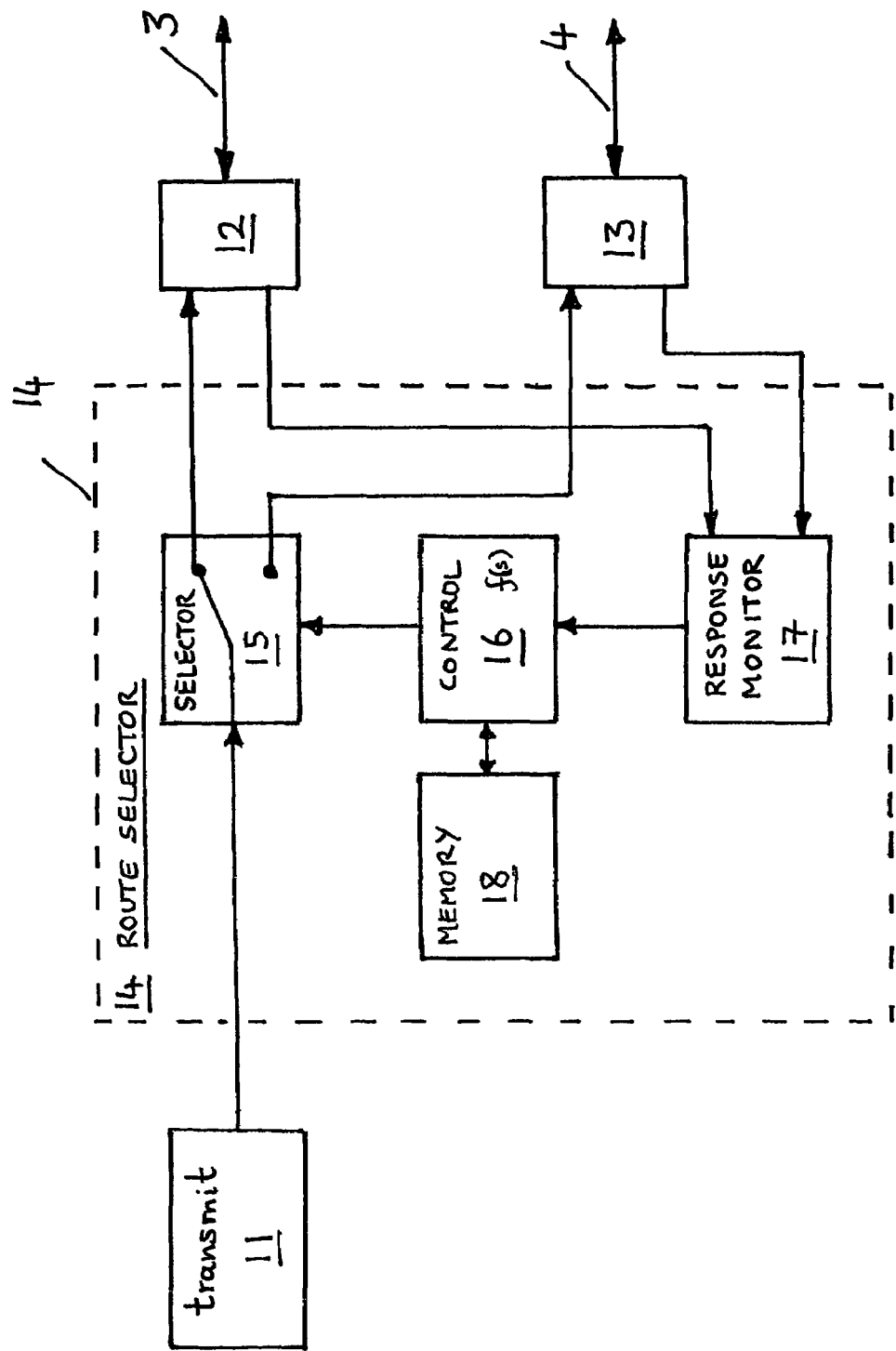
Figure 4:
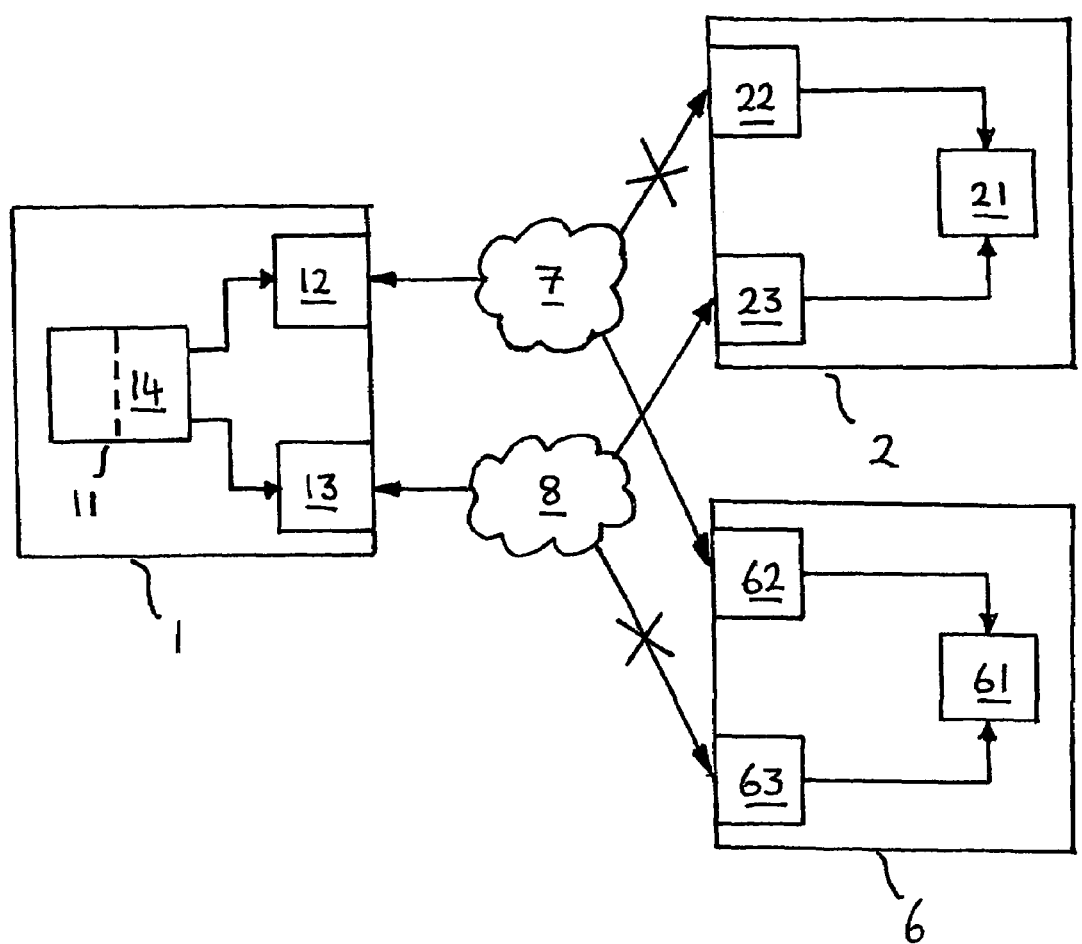

A route selector and a method of signal routing in accordance with the invention will now be described, by way of example only, with reference to the accompanying drawings in which:

FIG. 1 shows a signal source including a route selector in accordance with the invention connected by way of two connection networks to a signal destination, FIG. 2 shows a schematic representation of a signal route selector in accordance with the invention, FIG. 3 shows a signal source including a route selector in accordance with the invention connected by way of two connection networks to a signal destination which has a defective element, FIG. 4 shows a signal source including a route selector in accordance with the invention connected by way of two connection networks, parts of which are defective, to two signal destinations and FIG. 5 is a graphical representation of the probability that the route selector will choose a particular one of the available routes for a signal transmission.

Referring to FIG. 1 there is shown a signal source 1 connected by way of a first connection network 3 and by way of a second, alternative, connection network 4 to a signal destination 2.

The signal source 1 includes a transmit-unit 11 which is connected to a first bridge circuit 12 and to a second bridge circuit 13. The signal destination 2 includes a first receive-unit 21 which is connected to a third bridge circuit 22 and to a fourth bridge circuit 23. The first bridge circuit 12 is connected to the third bridge circuit 22 by way of the first connection network 3 and the second bridge circuit 13 is connected to the fourth bridge circuit 23 by way of the second connection network 4. The connection networks 3 and 4 provide bi-directional communication between the source and destination. Consequently the source 1 will also include a respective receive-unit and the signal destination 2 will also include a respective transmit-unit. For ease of describing the invention only component necessary for a single direction of communication from the source to the destination are described and illustrated in the accompanying drawings.

A route selector 14 is included in the transmit-unit 11 of the signal source 1 and is operable to control routing of signals over the alternative connection networks (hereinafter termed routes) between the source and destination. Referring to FIG. 2 there is shown a schematic representation of a signal route selector 14 in accordance with the invention. The signal router 14 comprises a selector 15 operable for selectably routing the signal from the transmit-unit to the selected route, a control unit 16 for controlling operation of the selector 15, a response monitor 16 for monitoring responses sent by the destination to the source and memory 18. The response monitor 17 is connected to the control unit 16 and is operable to provide data to the control unit indicative of whether transmission over the selected route has been successfully received by the receive unit. The memory 18 is operable to maintain a record of the number of successes and failures for each of the alternative routes. Although in FIG. 2 the signal route selector 14 is represented as being separate to the transmit-unit, in practice the route selector can be implemented as an algorithm within the transmit-unit. The response monitor 16 conveniently monitors response using proprietary communication protocols such as those present within IEEE 1394 networks, Ethernet networks or TCP protocols.

Referring again to FIG. 1, in operation, the transmit-unit 11 of the signal source 1 transmits signals to the first receive-unit 21 of the signal destination 2 by way of the first bridge circuit 12, the first connection network 3 and the third bridge circuit 22 and, provided that the signals reach the first receive-unit 21, receives responses from the first receive-unit 21 by the same signal route. Alternatively, the first transmit-unit 11 of the signal source 1 transmits signals to the first receive-unit 21 of the signal destination 2 by way of the second bridge circuit 13, the second connection network 4 and the fourth bridge circuit 23 and, provided that the signals reach the first receive-unit 21, receives responses by the same signal route which are detected by the response monitor 17. A specified period is allowed for the receipt of a response to a signal and the absence of a response within the specified period is noted by the response monitor as a failure of the signal route used.

The control circuit 16 of the route selector 14 selects either the first connection network 3 or the second connection network 4 for use in transmitting a signal between the signal source 1 and the signal destination 2. The selection is made on the basis of the record of successful previous attempts to send signals over a particular route (network connection) which are determined using the response monitor 17 and which are stored in the memory 18.

The route selector 14, more particularly the control unit 16, so operates that the probability of the selection of the route by way of the first bridge circuit 12, the first connection network 3 and the third bridge circuit 22 is expressed as a discontinuous function f(s) which is defined as follows:

$f(s)=1-2^{-s}$ for s=1, 2, . . . n
$f(s)=\frac{1}{2}$ for s=0
$f(s)=2^s$ for s=-1, -2, . . . -n, where s is always an integer.

The function f(s) is illustrated in FIG. 5 for a range s=-4 to s=5, both limits included, including the discontinuous regions AB, BC and CD.

As is evident from FIG. 5, the value of f(s) is ½ for the values of s in the region of 1, 0 and -1 and f(s) has a first asymptotic limit (aslimit1) value of 1 for large and positive s and a second asymptotic limit (aslimit2) value of 0 for large and negatives.

In the operation, following each attempt at a transmission through the transmission network 3, the probability of the next transmission being routed through the first transmission network 3 is adjusted according to whether or not the attempt succeeded. On a failed attempt at transmission through the transmission network 3, an attempt is made to use the second transmission network 4. The existing value of s is modified as follows according to the results:

if the attempt to use transmission network 3 succeeded, make s=s+1, if s<0,
if the attempt to use transmission network 4 succeeded, make s=s-1, if s>0,
if the attempt to use transmission network 3 failed, make s=s-1, if |s|<aslimit1,
if the attempt to use transmission network 4 failed, make s=s+1, if |s|<aslimit2.

A successful attempt to use the transmission network 3 FIG. 1) results in the probability value moving in the positive direction of s when the value of s lies in the region BC (FIG. 5) at which f(s)=½ and a successful attempt to use transmission network 4 (FIG. 1), following a failure on transmission network 3 (FIG. 1), results in the probability value moving in the negative direction of s when the value of s lies in the region BC (FIG. 5) at which f(s)=½. A failed attempt to use transmission network 3 FIG. 1 when the value of s lies in the region CD FIG. 5) at which ½<f(s)<1 results in the probability value moving in the negative direction of s, thereby reducing the value of f(s). A failed attempt to use transmission network 4 (FIG. 1) when the value of s lies in the region AB (FIG. 5) at which 0<f(s)<½ results in the probability value moving in the positive direction of s, thereby increasing the value of f(s).

In respect of FIGS. 1 and 5, the response monitor 17 monitors the responses to signals transmitted and detects failures to obtain a response. Each failure causes the control unit 16 to move the selection preference towards the alternative connection network and an attempt to transmit is made on the alternative network. Each successful attempt moves the preference back towards the neutral (s=0) position. The movement has a limit and, even with a long-standing failure of a connection network, a small number of attempts are still made on the failed connection network. The arrangement thus allows the signal source 1, under the influence of the route selector 14, to respond autonomously to the recovery of a failed network and to maintain a balanced demand on networks even in the presence of multiple failures.

When both the first connection network 3 and the second connection network 4 are operational, the two connection networks will receive, more or less, equal numbers of attempts at transmitting signals between the signal source 1 and the signal destination 2 and that situation persists for as long as each network meets all of the demands made of it.

Referring now to FIG. 3 there is shown the signal source 1 of FIG. 1 connected, by way of the connection networks 3 and 4, to an alternative signal destination 5 which includes a fifth bridge circuit 52, a sixth bridge circuit 53, and receive-units 54 and 55 respectively.

FIG. 3 shows the receive-unit 54 as being defective (this is indicated by a cross) and the result is that the response monitor 17 within the signal source 1 records failed attempts on both the connection networks 3 and 4 when the defective receive-unit 54 is the required destination.

Applying the probability function illustrated in FIG. 5, the value of s moves principally between −1 and 0 or 0 and 1, during which movements the value of f(s) remains substantially at ½, resulting in substantially balanced use of the connection networks 3 and 4.

Reference is made to FIG. 4 which shows the signal source 1 of FIG. 1 connected, by way of branched connection networks 7 and 8, to the signal destination 2 of FIG. 1 and to a second signal destination 6 which includes a seventh bridge circuit 62, an eighth bridge circuit 63 and a respective receive-unit 61.

The branded connection network 7 connects the first bridge circuit 12 of the signal source 1 to the third bridge circuit 22 of the signal destination 2 and to the seventh bridge circuit 62 of the second signal destination 6. The connection network 8 connects the second bridge circuit 13 of the signal source 1 to the fourth bridge circuit 23 of the signal destination 2 and to the eighth bridge circuit 63 of the second signal destination 6. As shown in FIG. 4, the connection network 7 has a defect (indicated by a cross) between first the bridge circuit 12 and the third bridge circuit 22 while the connection network 8 has a defect (indicated by a cross) between the second bridge circuit 13 and the eighth bridge circuit 63.

In a situation where the transmit-unit 11 attempts to transmit to the first receive-unit 21 every 10 milliseconds and attempts to transmit to the fourth receive-unit 61 every second and is successful in substantially all attempts, then, between the attempts to transmit to the fourth receive-unit 61, the value of the function f(s) moves on to the region CD of FIG. 5 in favour of the second bridge circuit 13 of the signal source 1. When, in due course, the next attempt is made to transmit to the fourth receive-unit 61, the probability is that the second bridge circuit 13 of the signal source 1 is selected initially on the basis of the existing value of f(s). The initial attempt fails as a result of the presence of the defective connection network 8 between the second bridge circuit 13 and the eighth bridge circuit 63. Following the failure, an attempt is made to use the first bridge circuit 12 and the connection network 7 and is successful.

In respect of the situation shown in FIG. 4, where the signal source 1 attempts to transmit to both the receive-unit 21 in the signal destination 2 and receive-unit 61 in the second signal destination 6 in the face of the connection network failures shown, the performance of the signal source 1, under the influence of the route selector 14 is such as to favour the more frequently accessed unit in a signal destination. The overall effect is that the throughput is adaptively optimised to the current conditions.

A route selector 14 as included in the signal source 1 provides the following results:

It protects against silent (undetected) failure of either connection network of a pair of alternative connection networks.

It maintains throughput under failure of either of two alternative connection networks.

It responds automatically to the restoration of a failed connection network.

It responds quickly to the restoration of either of two connection networks following the failure of both networks.

It is resilient to failures outside the connection networks, for example, the failure of a receiver-unit.

It maintains a balanced through put during partial failures of both of two connection networks.

The invention claimed is:

1. A signal route selector apparatus for routing a signal along one of a plurality of alternative routes between a source and a destination, the route selector comprising:
   a) means for determining whether transmissions between the source and the destination succeed or fail;
   b) means for maintaining a record of successes and failures for the routes;
   c) means for selecting a route for a transmission according to the record of successes and failures for the routes;
   d) means, in operation, for awarding probability values of successful transmission to the routes according to the record of the successes and failures for the routes, and for selecting the route according to awarded probability values;
   e) wherein the awarding means, in operation, awards the probability values ranging between a first limit value for repeated successes and a second limit value for repeated failures; and
   f) wherein the second limit is such that a route which is awarded the second limit value is selected from time to time according to the awarded probability values even in case of long-standing failure of that route.

2. The signal route selector apparatus as claimed in claim 1, wherein the awarding means, in operation, awards the probability values including a normal value lying substantially halfway between the limit values for repeated successes on all of the routes, for a selected ratio of usage of the routes.

3. The signal route selector apparatus as claimed in claim 2, wherein the awarding means, in operation, selects the selected ratio of the usage of the routes as equal usage of the routes.

4. The signal route selector apparatus as claimed in claim 2, wherein the normal value remains the same for a range of values of a variable derived from the successes and failures.

5. The signal route selector apparatus as claimed in claim 1, wherein the selecting means is operative for selecting the route for transmission following awarding a probability of success f(s) in accordance with the following:
   $f(s)=1-2^{-s}$ for s=1, 2, . . . n,
   $f(s)=½$ for s=0,
   $f(s)=2^s$ for s=−1, −2, . . . −n,
   which is discontinuous,
   where s is a variable which is always an integer and is derived from the successes and failures of transmission attempts as follows, aslimit1 being the value of s corresponding to the first limit value for a first transmission network and aslimit2 being the value of s corresponding to the second limit value for the first transmission network:
   i) if the attempt to use the first transmission network succeeded, make s=s+1, if s<0, ii) if the attempt to use an alternative transmission network succeeded, make s=s−1, if s>0, iii) if the attempt to use the first transmission network failed, make s=s−1, if |s|<aslimit1, and iv) if the attempt to use the alternative transmission network failed, make s=s+1, if |s|<aslimit2.

6. A method of routing a signal along one of a plurality of alternative routes between a source and a destination, comprising the steps of:

a) determining whether transmissions between the source and the destination succeed or fail;

b) maintaining a record of the successes and failures for the routes;

c) selecting a route for a transmission according to the record of successes and failures for the routes;

d) awarding probability values of successful transmission to the routes according to the record of the successes and failures for the routes, and selecting the route according to awarded probability values;

e) wherein the probability values range between a first limit value for repeated successes and a second limit value for repeated failures; and f) wherein the second limit is such that a route which is awarded the second limit value is selected from time to time according to the awarded probability values even in case of long-standing failure of that route.

7. The method as claimed in claim 6, wherein the probability values include a normal value lying substantially halfway between the limit values for repeated successes on all of the routes, for a selected ratio of usage of the routes.

8. The method as claimed in claim 7, wherein the selected ratio of the usage of the routes is equal usage of the routes.

9. The method as claimed in claim 7, wherein the normal value remains the same for a range of values of a variable derived from the successes and failures.

10. The method as claimed in claim 6, wherein the selecting step is performed by selecting the route for transmission following awarding a probability of success f(s) in accordance with the following:

$f(s)=1-2^{-s}$ for s=1, 2, . . . n, $f(s)=½$ for s=0, $f(s)=2^s$ for s=−1, −2, . . . −n, which is discontinuous, where s is a variable which is always an integer and is derived from the successes and failures of transmission attempts as follows: aslimit1 being the value of s corresponding to the first limit value for a first transmission network and aslimit2 being the value of s corresponding to the second limit value for the first transmission network:

i) if the attempt to use a first transmission network succeeded, make s=s+1, if s<0, ii) if the attempt to use an alternative transmission network succeeded, make s=s−1, if s>0, iii) if the attempt to use the first transmission network failed, make s=s−1, if |s|<aslimit1, and iv) if the attempt to use the alternative transmission network failed, make s=s+1, if |s|<aslimit2.

\* \* \* \* \*